April 5, 1938.  J. PEYSER  2,112,862
METHOD OF AND MEANS FOR PRODUCING MATCH BOOKS
Filed March 15, 1935  13 Sheets-Sheet 1
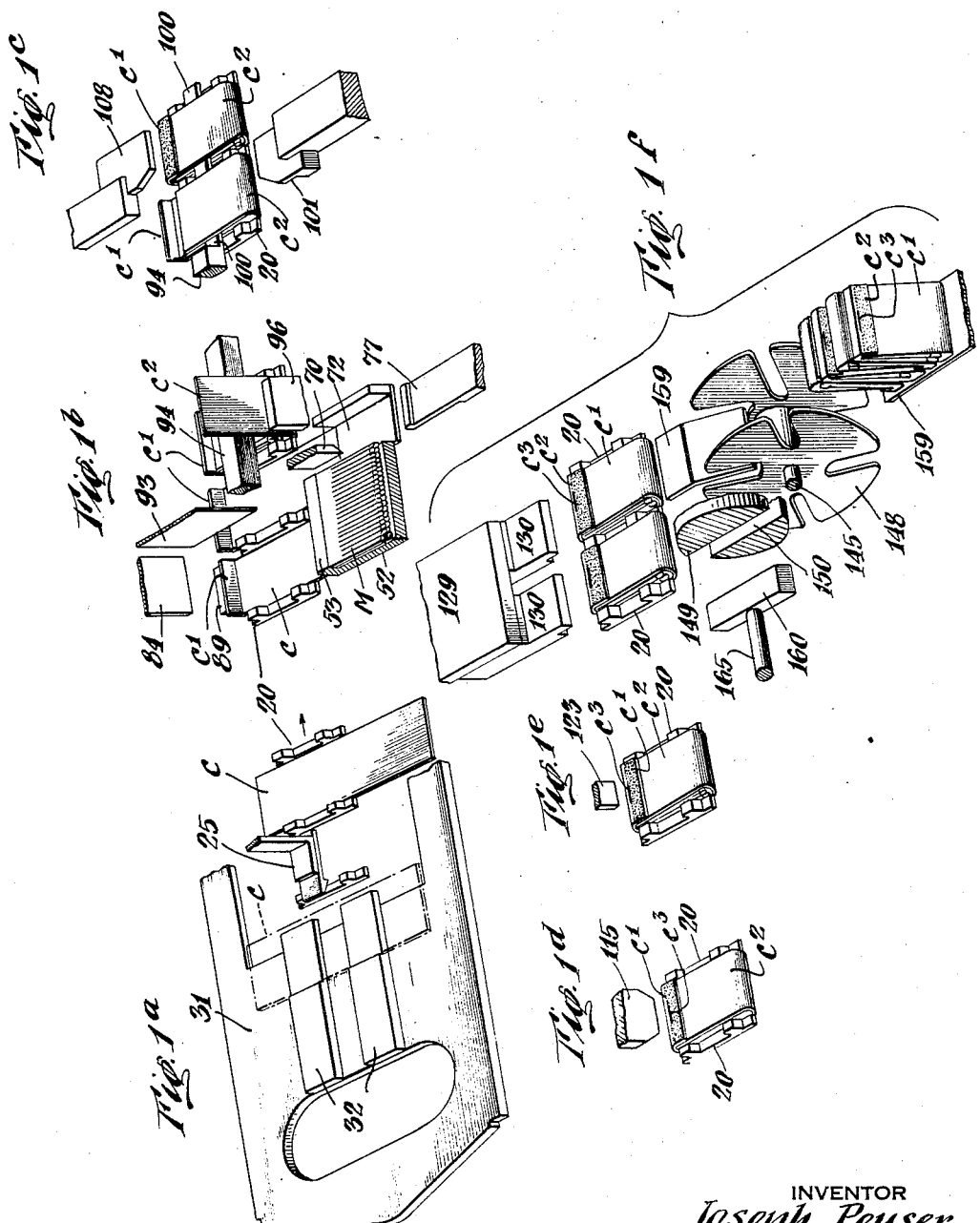
INVENTOR
*Joseph Peyser*
BY
ATTORNEY April 5, 1938. J. PEYSER 2,112,862
METHOD OF AND MEANS FOR PRODUCING MATCH BOOKS
Filed March 15, 1935 13 Sheets-Sheet 2
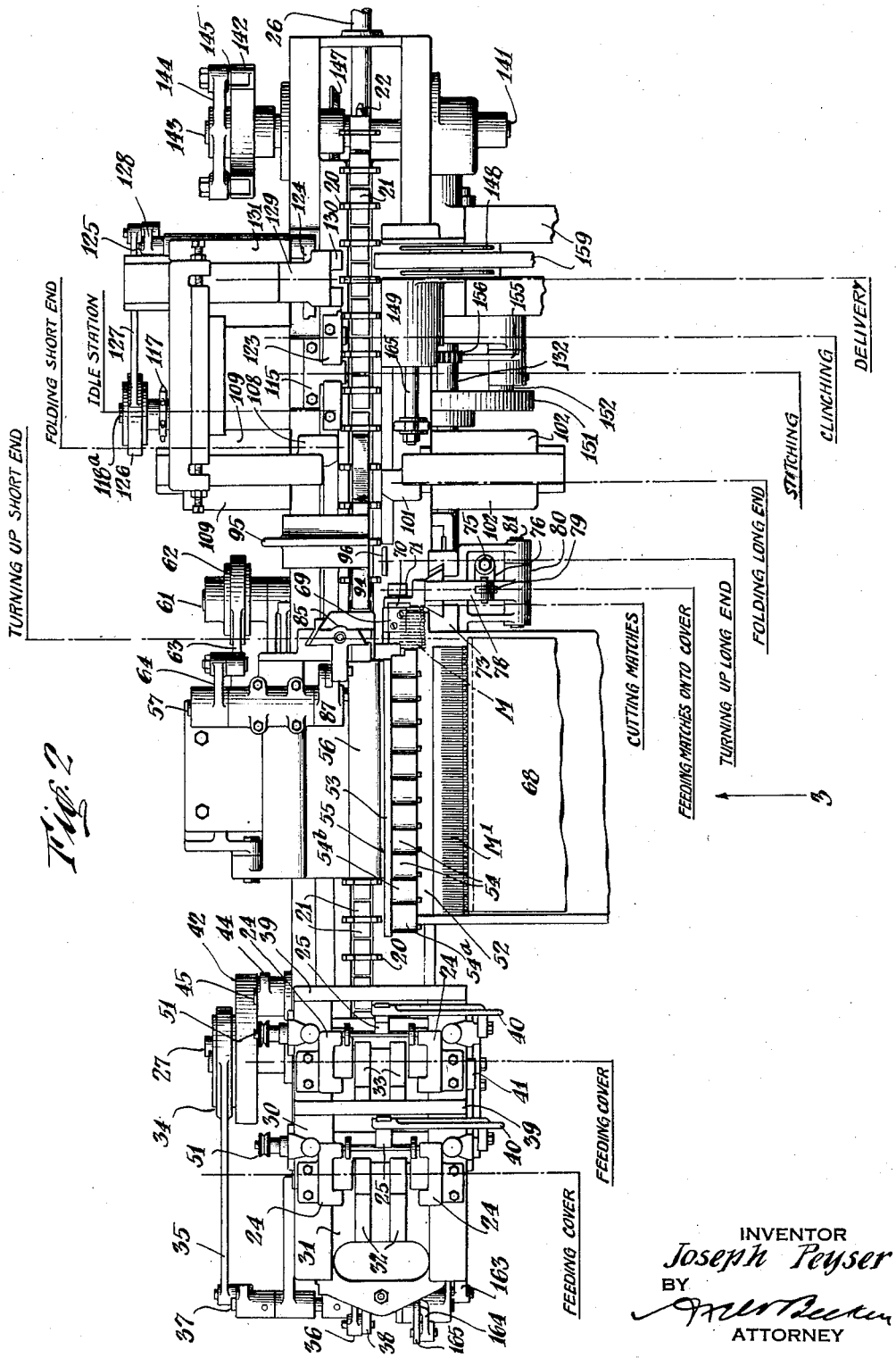
INVENTOR
Joseph Peyser
BY
ATTORNEY April 5, 1938.  J. PEYSER  2,112,862
METHOD OF AND MEANS FOR PRODUCING MATCH BOOKS
Filed March 15, 1935  13 Sheets-Sheet 3
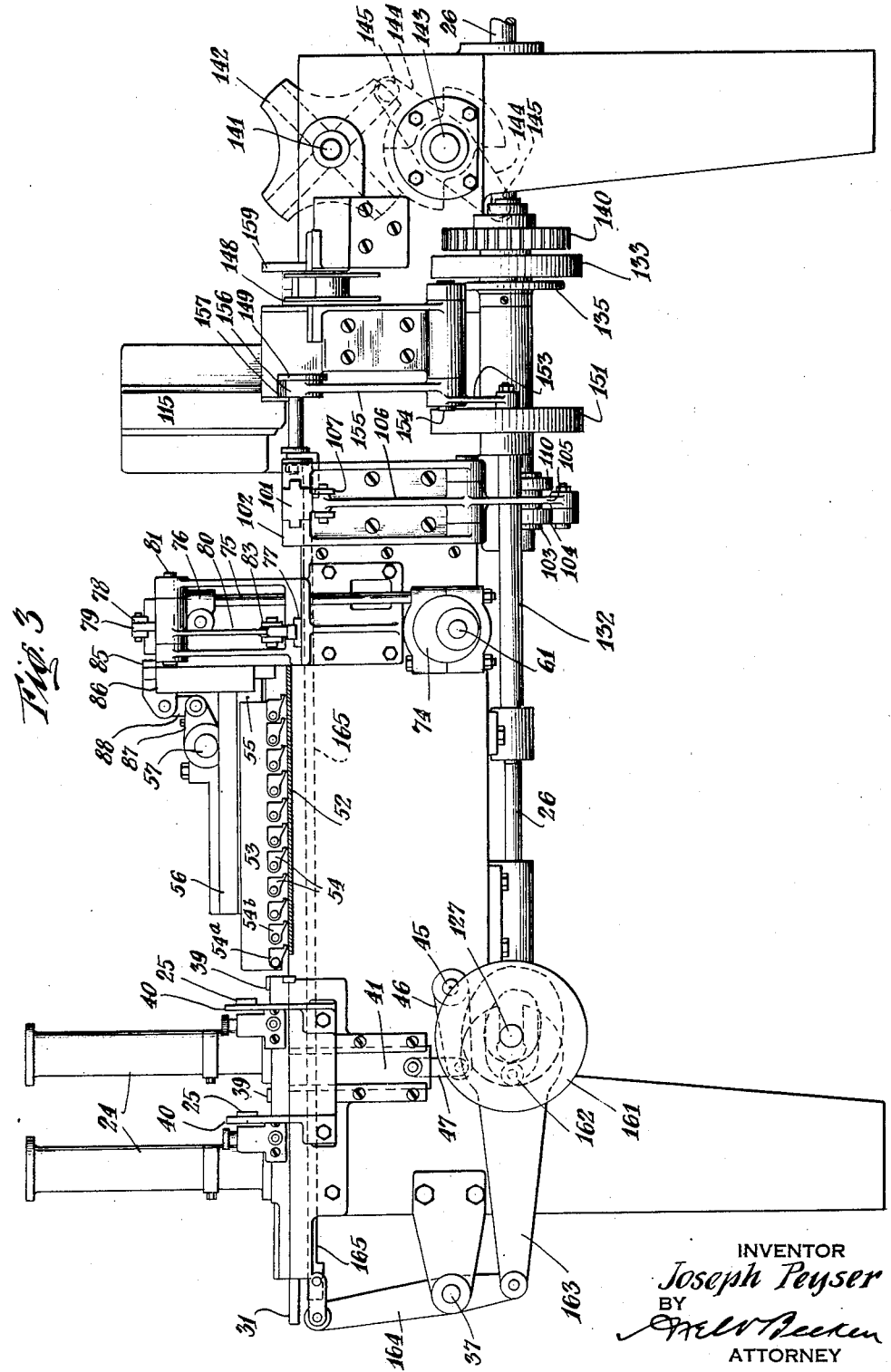
INVENTOR
Joseph Peyser
BY
ATTORNEY April 5, 1938. J. PEYSER 2,112,862
METHOD OF AND MEANS FOR PRODUCING MATCH BOOKS
Filed March 15, 1935 13 Sheets-Sheet 4
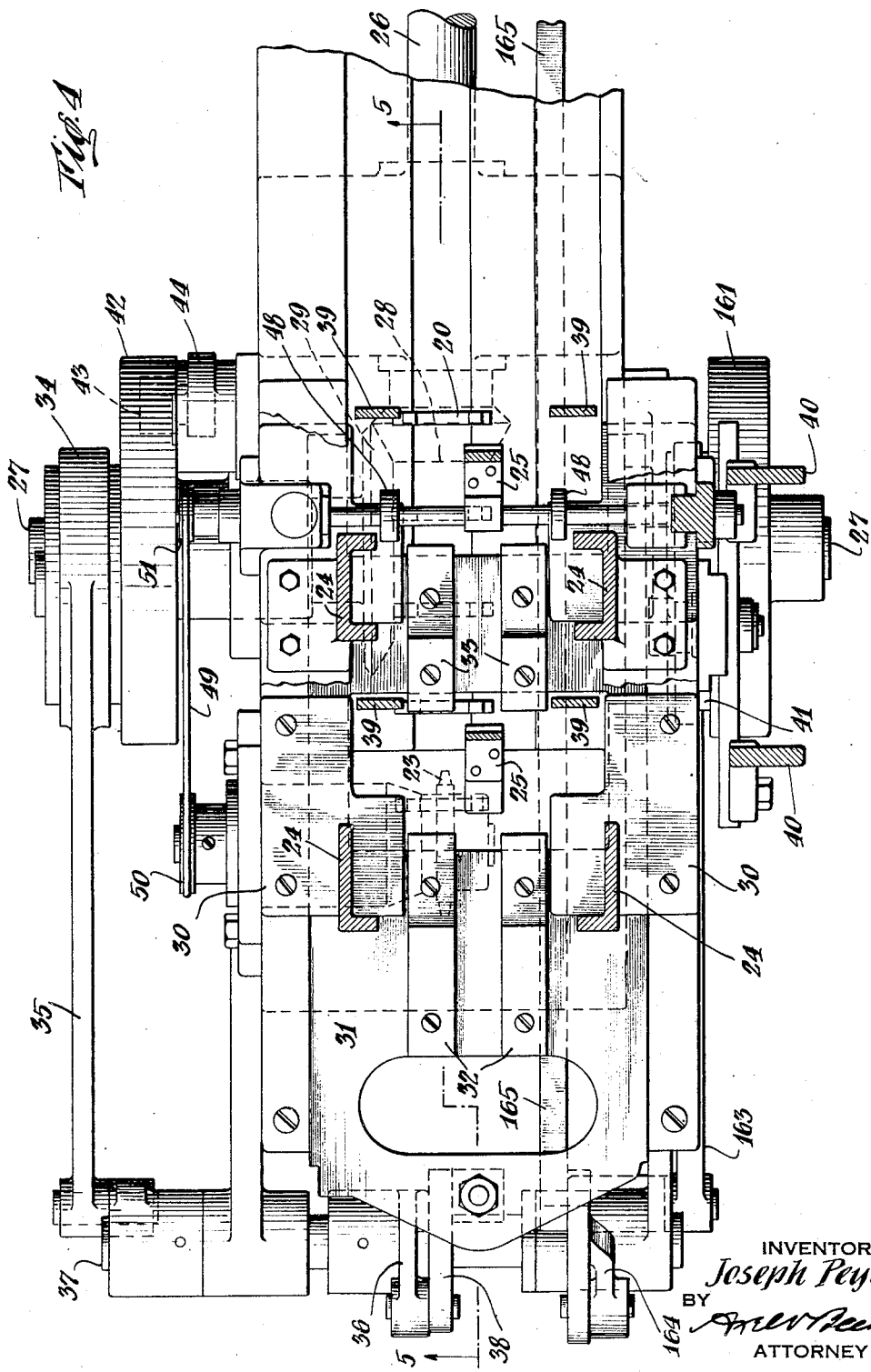
INVENTOR
*Joseph Peyser*
BY
ATTORNEY April 5, 1938.  J. PEYSER  2,112,862
METHOD OF AND MEANS FOR PRODUCING MATCH BOOKS
Filed March 15, 1935  13 Sheets-Sheet 5
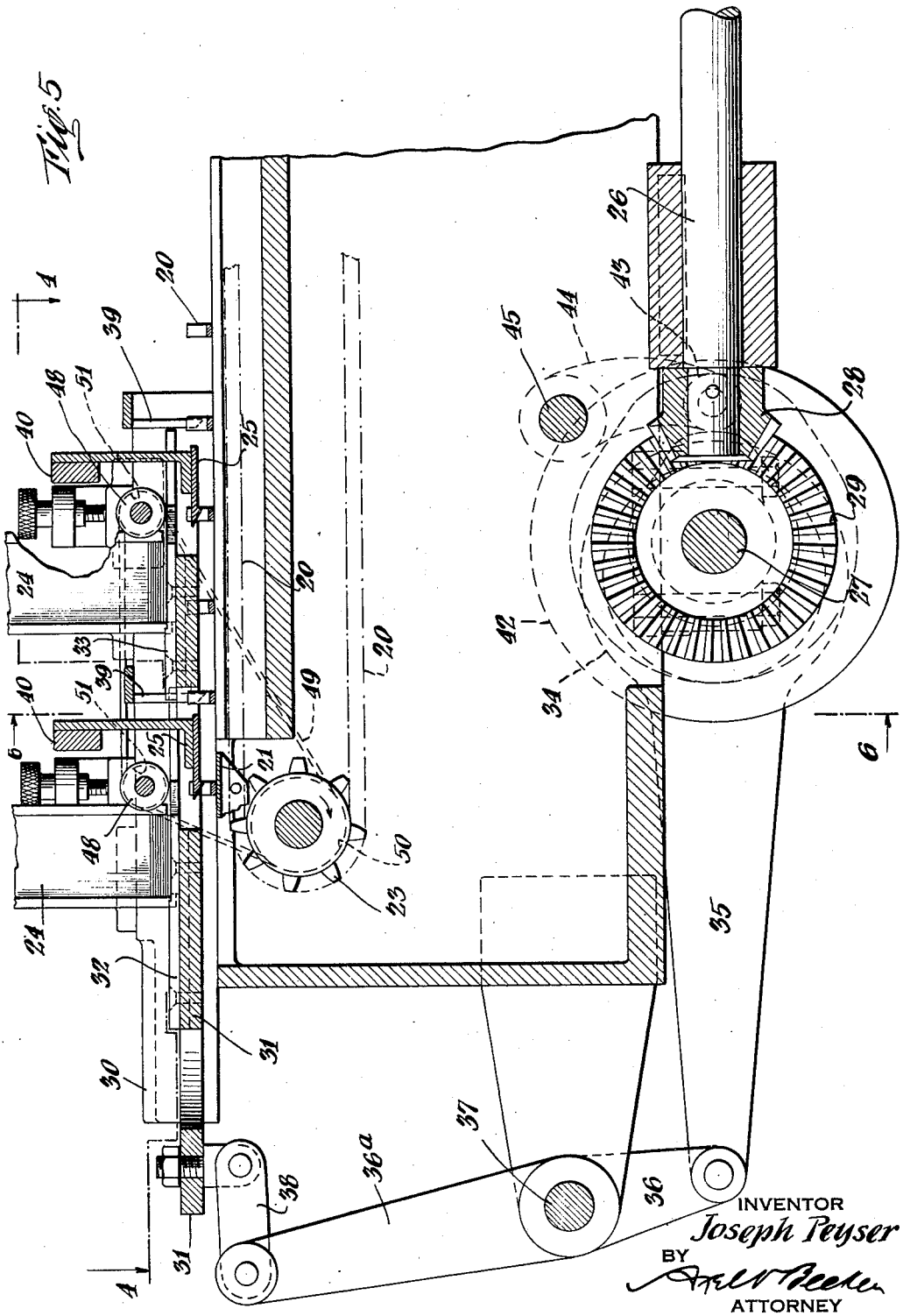
INVENTOR
Joseph Peyser
BY
ATTORNEY

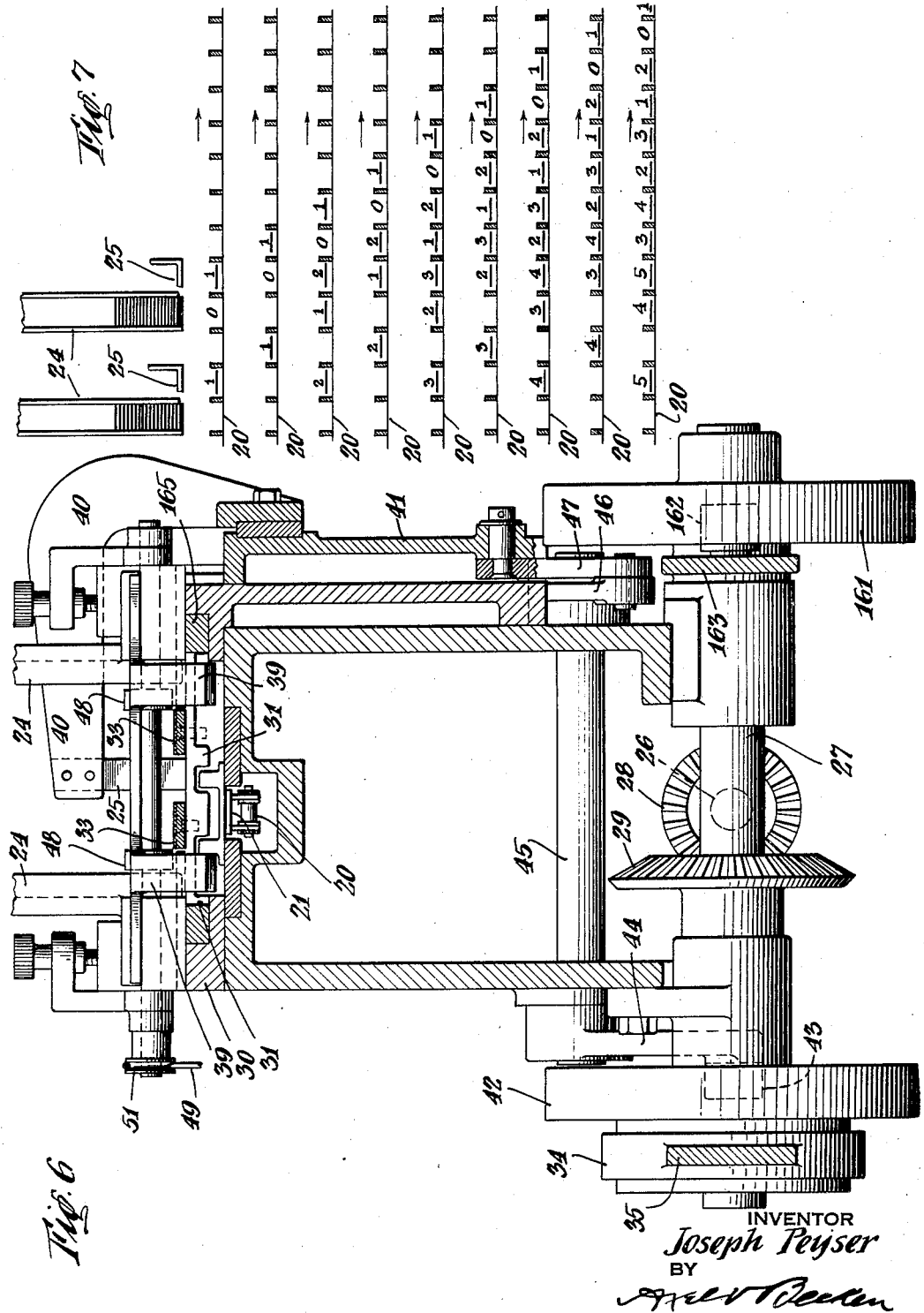

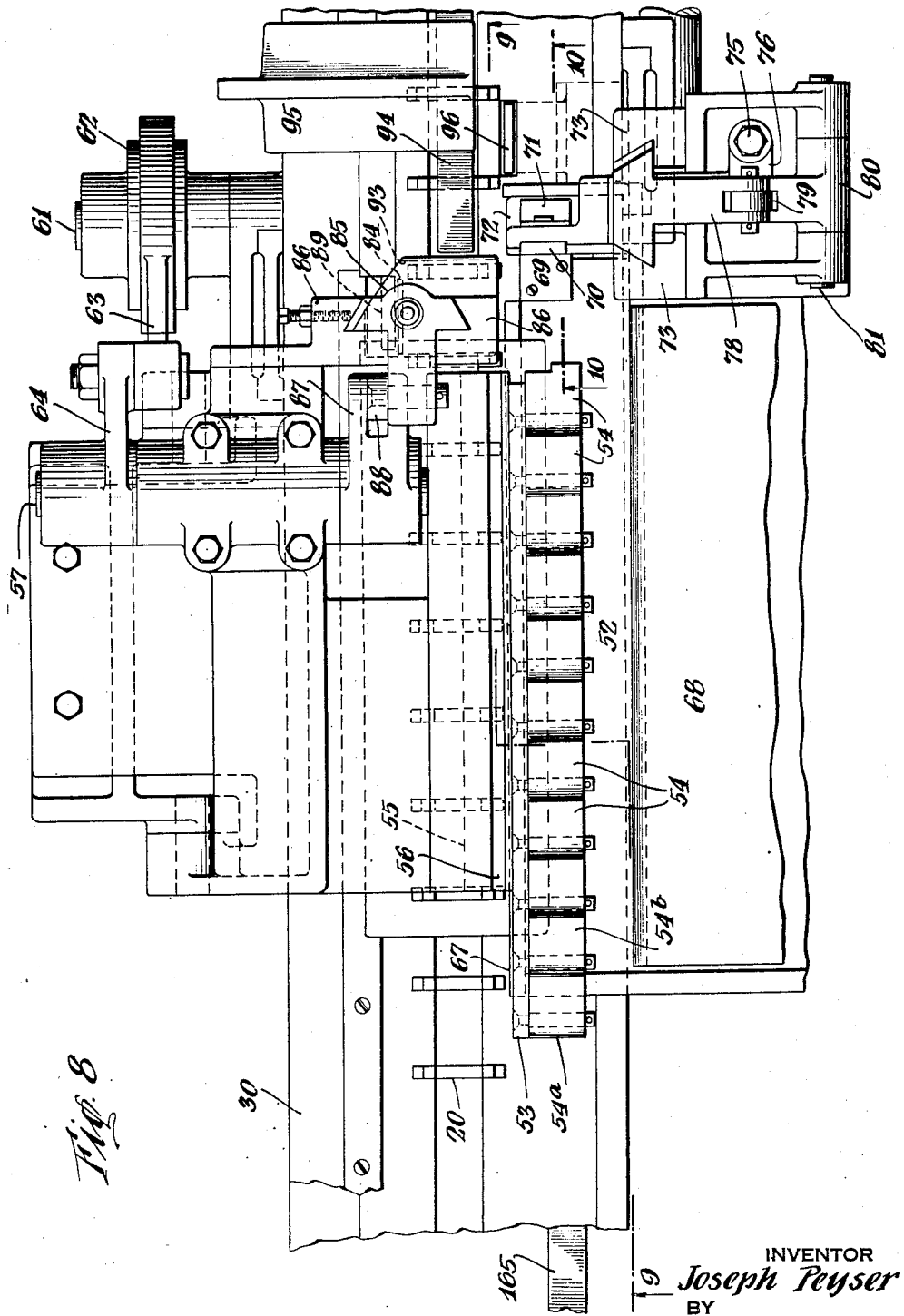

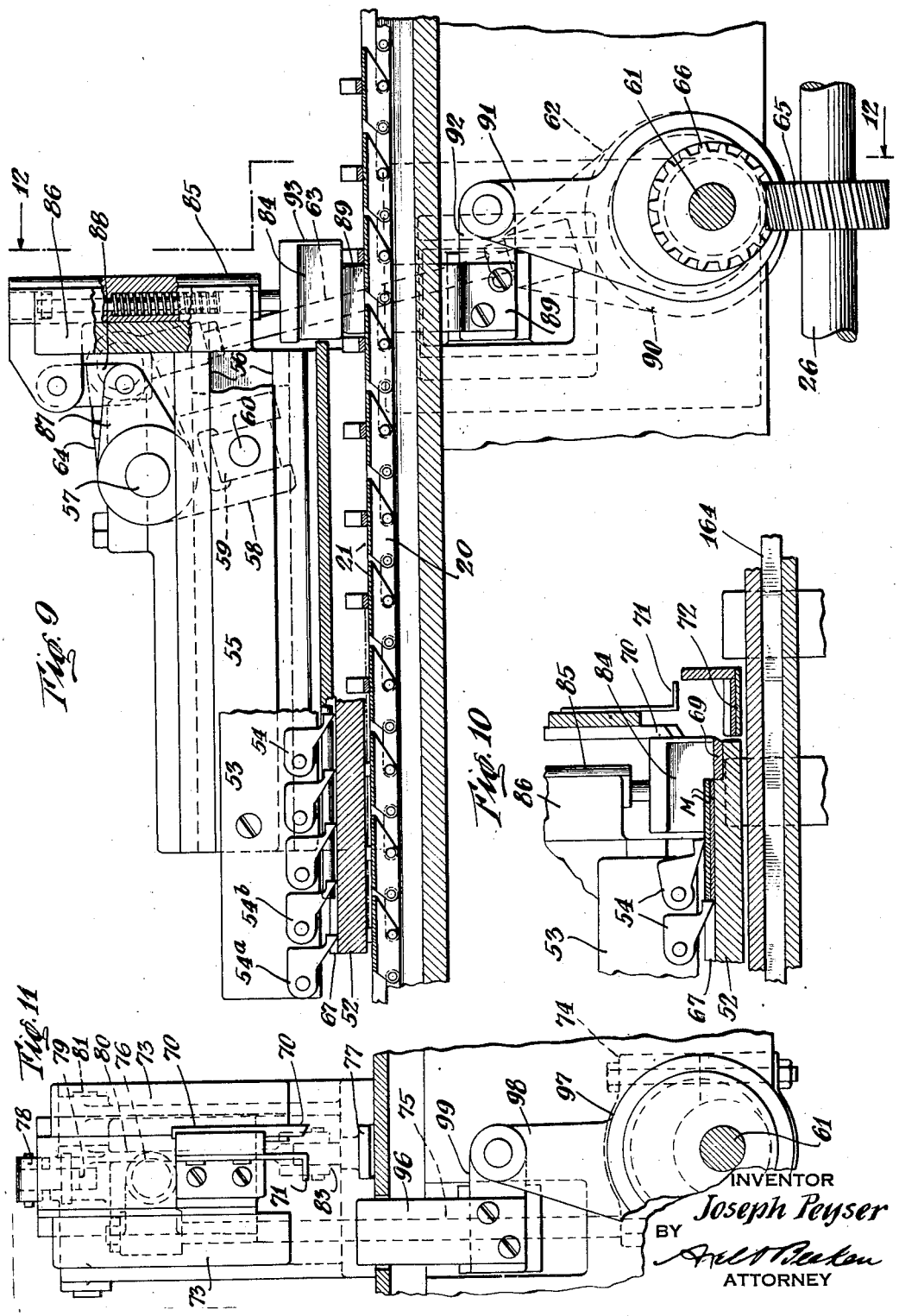

April 5, 1938. J. PEYSER 2,112,862
METHOD OF AND MEANS FOR PRODUCING MATCH BOOKS
Filed March 15, 1935 13 Sheets-Sheet 12

Fig. 15

INVENTOR
*Joseph Peyser*
BY
ATTORNEY

April 5, 1938.  J. PEYSER  2,112,862
METHOD OF AND MEANS FOR PRODUCING MATCH BOOKS
Filed March 15, 1935   13 Sheets-Sheet 13
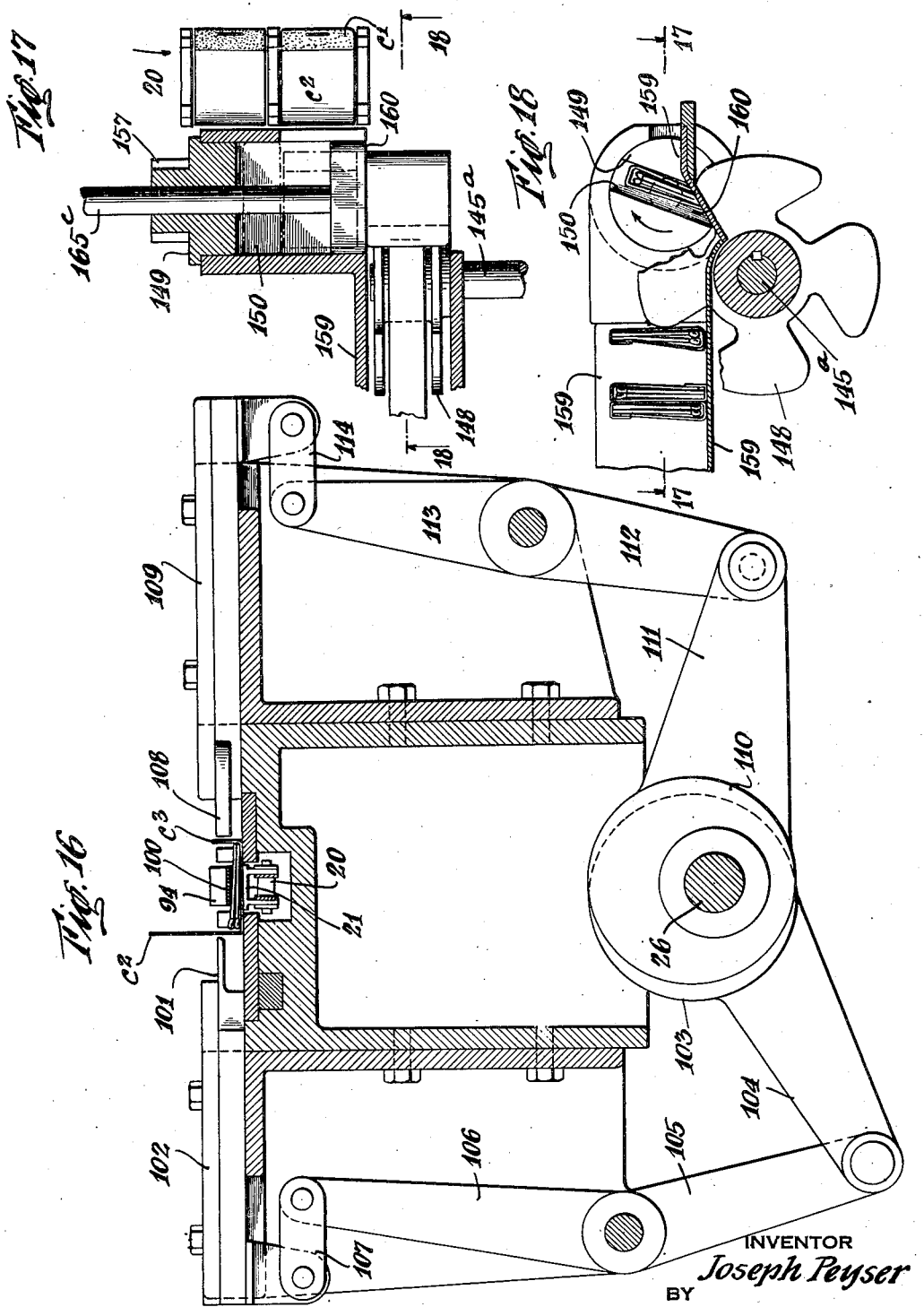
INVENTOR
Joseph Peyser
BY
ATTORNEY Patented Apr. 5, 1938

2,112,862

UNITED STATES PATENT OFFICE 2,112,862

METHOD OF AND MEANS FOR PRODUCING MATCH-BOOKS

Joseph Peyser, Mount Vernon, N. Y.

Application March 15, 1935, Serial No. 11,269

9 Claims. (Cl. 93—2)

This invention relates to methods of and means for producing match-books, and has for its main object and feature the devising of method and means of simple and efficient character for producing match-books at a greater speed than heretofore.

In the accompanying drawings, the invention is shown in a concrete and preferred form in which:

Figs. 1a to 1f are diagrammatic perspective views showing the main steps of operation in producing a match-book;

Fig. 2 is a top-plan view of the machine;

Fig. 3 is a view in side elevation, partly in section, looking in the direction of arrow 3 in Fig. 2;

Fig. 4 is a horizontal sectional view substantially on the plane of line 4—4 of Fig. 5 of the cover feeding mechanism;

Fig. 5 is a longitudinal vertical sectional view substantially on the plane of line 5—5 of Fig. 4;

Fig. 6 is a transverse vertical sectional view substantially on the plane of line 6—6 of Fig. 5;

Fig. 7 is a diagrammatic view showing the steps of feeding cover blanks;

Fig. 8 is an enlarged plan view of the middle portion of Fig. 2;

Fig. 9 is a vertical sectional view substantially on the plane of irregular line 9—9 of Fig. 8;

Fig. 10 is a fragmentary vertical sectional view substantially on the plane of line 10—10 of Fig. 8;

Fig. 11 is a vertical sectional view substantially on the plane of line 11—11 of Fig. 12;

Fig. 15 is a transverse vertical sectional view substantially on the plane of line 15—15 of Fig. 13;

Fig. 16 is a transverse vertical sectional view substantially on the plane of line 16—16 of Fig. 13;

Fig. 17 is a horizontal sectional view substantially on the plane of line 17—17 of Fig. 18; and Fig. 18 is a vertical sectional view substantially on the plane of line 18—18 of Fig. 17.

Figure 13:
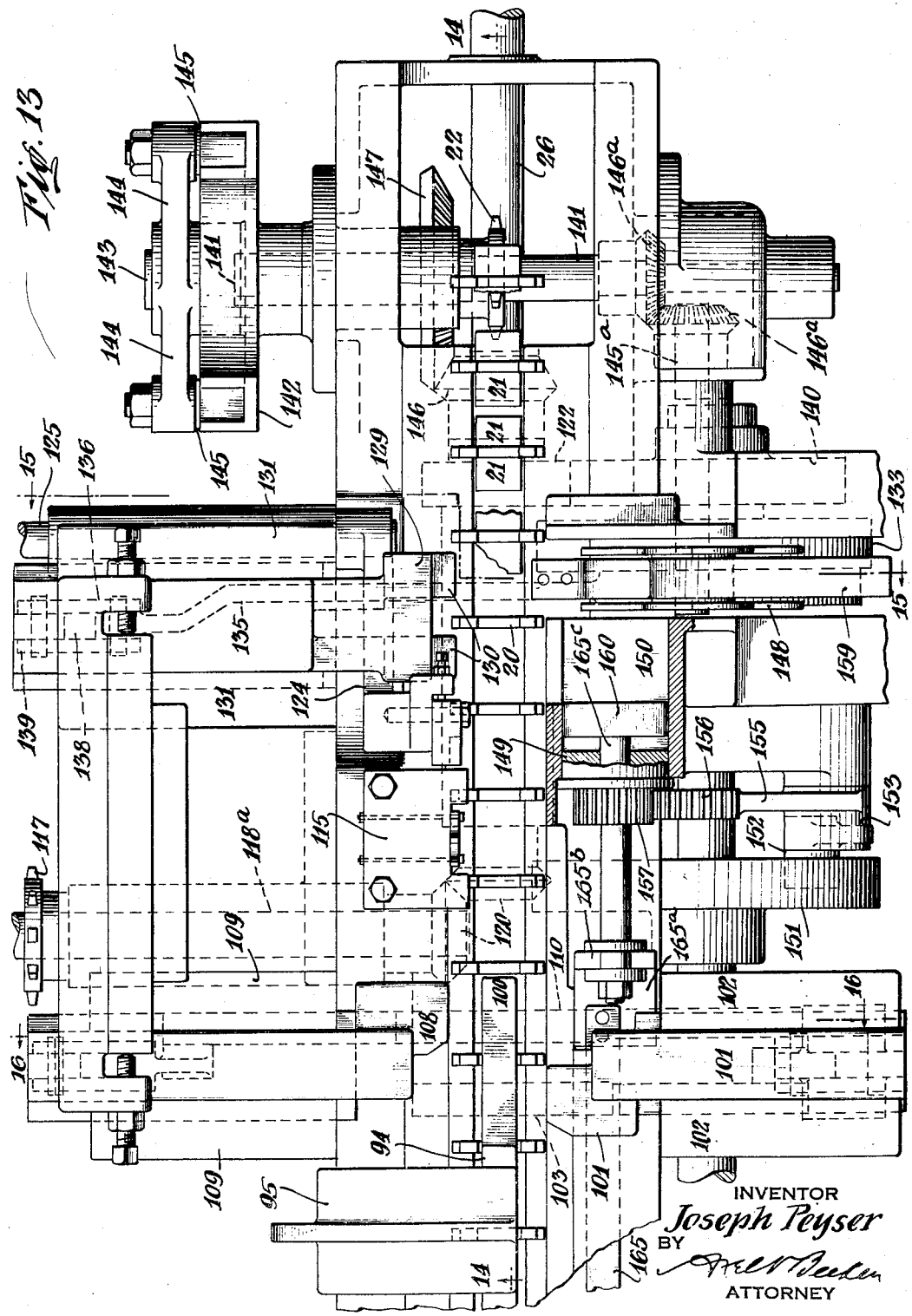
Fig. 13 is an enlarged plan view of the right-hand end of Fig. 2, partly in section.
Figure 14:
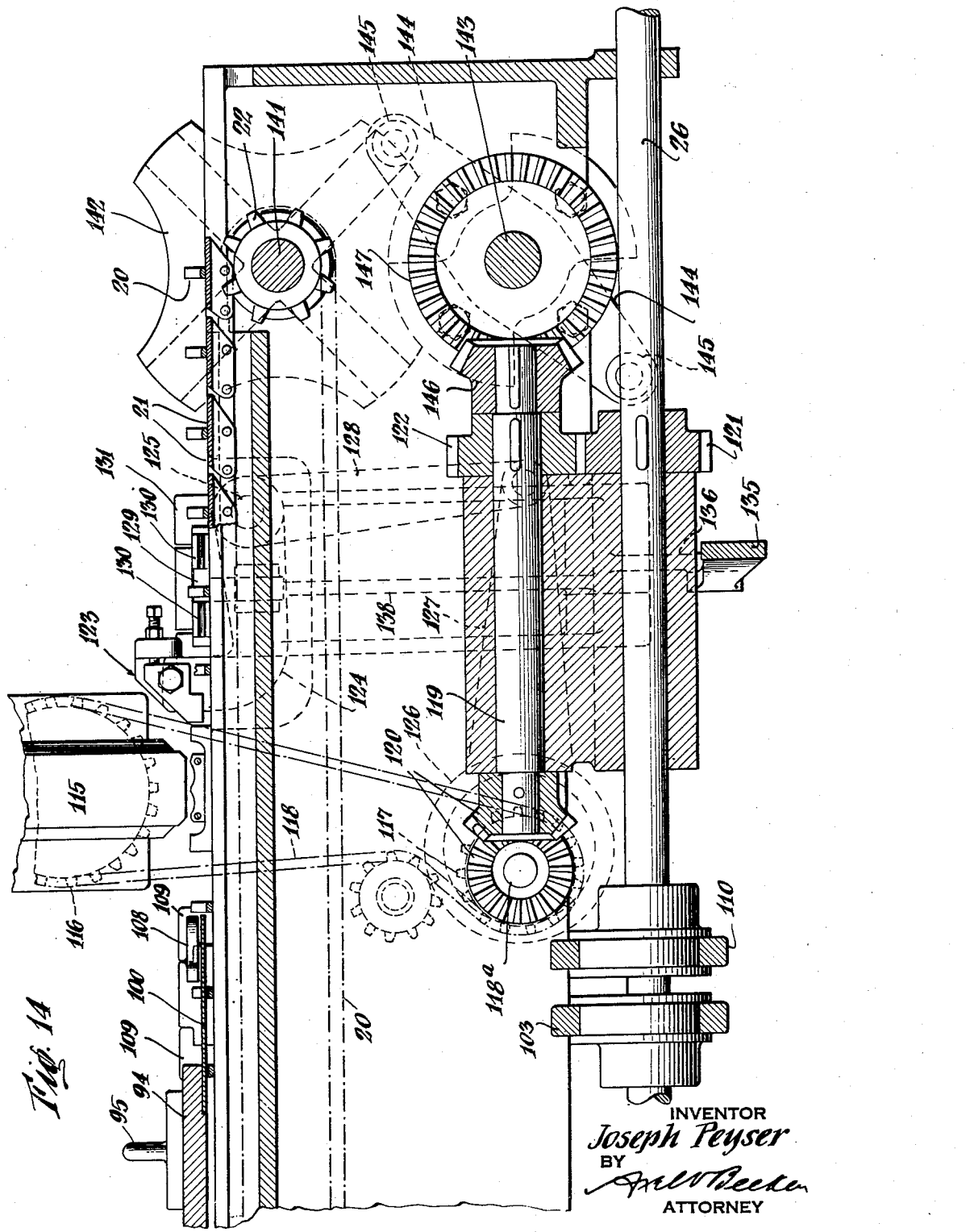
Fig. 14 is a vertical longitudinal sectional view substantially on the plane of line 14—14 of Fig. 13.

20 indicates a conveyer here in the form of an intermittently movable sprocket chain having blank or cover supporting compartments or surfaces 21, said chain being trained over sprockets 22 and 23 at opposite ends of the machine (Figs. 2, 5, 9, 13 and 14). Arranged alongside this conveyer are the various instrumentalities or mechanisms for associating cover blanks and match-combs. The general arrangement will readily be understood from Fig. 2 where the various stations are identified by legends.

Suitable means are provided for feeding the covers, and these means may take the form shown in application Ser. No. 13,473 filed March 28, 1935 where the covers are obtained from a roll of paper which is severed transversely at intervals to produce the individual cover blanks, but preferably the cover feeding means take the following form: Referring to Figs. 2 to 7 inclusive, two cover hoppers 24 are arranged in tandem but not closely adjacent. The method used is to feed two cover blanks simultaneously once to every two intermittent movements of conveyer 20. This method will be most readily understood by referring to Fig. 7 which shows the two cover stacks and the position of cover blanks on the conveyer after each of a number of movements of said conveyer. As there shown, the covers do not fall on the conveyer surfaces directly beneath the stacks but are fed (by means presently to be described) forward in the direction of movement of the conveyer and downward beneath guides 25 to the conveyer. Nine positions of the conveyer are shown in the diagram. At the beginning of the operation two cover blanks, indicated by 1, are simultaneously fed to the conveyer, and it will be seen that these two blanks are spaced relatively widely apart, and may be denominated a first and a fourth blank inasmuch as they are separated by two empty conveyer compartments. The conveyer now makes a step in the direction of the arrow and then stops when it arrives in the second position, in which position no cover blanks are fed to the conveyer. The conveyer now makes another step and arrives at the third position, and during its pause in that position two more cover blanks, here indicated by 2, are fed to the conveyer. Another step of the conveyer brings us to the fourth position in which no cover blanks are fed. When the conveyer arrives at the fifth position, two more cover blanks, indicated by 3 are fed to the conveyer. In the sixth position of the conveyer no cover blanks are fed, but in the seventh position two cover blanks, 4, are again fed. In the eighth position, no cover blanks are fed, but in the ninth position two cover blanks, 5, are fed. It is unnecessary to show additional positions of the conveyer because it will be seen from the foregoing that a first and a fourth blank are fed to the conveyer after each two intermittent movements thereof, and that the result of this is to produce a succession of closely spaced blanks on the conveyer, every compartment being filled except the one marked 0. This compartment can be filled by hand, or the foremost blank marked 1, adjacent to 0, can be removed, the proper succession of blanks being thereafter produced automatically. Extending longitudinally through the machine is main shaft 26 that here makes one revolution to each cycle of the machine, i. e. to each match-book produced. 27 is a cross-shaft deriving its motion from 26 by means of bevel gears 28 and 29 (Figs. 4, 5 and 6) and it will be seen that the gear ratio is such that shaft 27 makes one revolution to every two revolutions of 26. Shaft 27 actuates the cover feeding mechanism, which latter is constructed as follows: cover blank hoppers 24, of which there are two arranged in tandem above the conveyer, are composed of channels, carried by framework 30 of the machine, and are open at the bottom. 31 indicates a horizontal slide mounted in the framework below the hoppers and carries two pairs of feed members 32 and 33, one pair for each hopper. Reciprocating motion is imparted to slide 31 by means of eccentric 34 on shaft 27, arm 35, lever 36 on rock-shaft 37, lever 36a also on rock-shaft 37, and link 38. In accordance with the usual operation of hopper feeds of this character, the lowermost blank is fed forwardly out of the hopper and drops through an opening in the framework to the conveyer. Front-registering devices indicated at 39 may be used in connection with the hopper feed and likewise, in the present instance, movable guides or ejectors 25 may be utilized. As here shown, guides 25 are carried by brackets 40 mounted on vertical slide 41, which latter is actuated from cam 42 on shaft 27 by means of cam roller 43, arm 44, rock-shaft 45, arm 46 and link 47. In order to prevent more than one cover blank from being fed at a time, rollers 48 may be employed that are conveniently driven by means of a belt 49 trained over a pulley 50, moving with sprocket 23, and over pulleys 51 carried by rollers 48.

Figure 12:
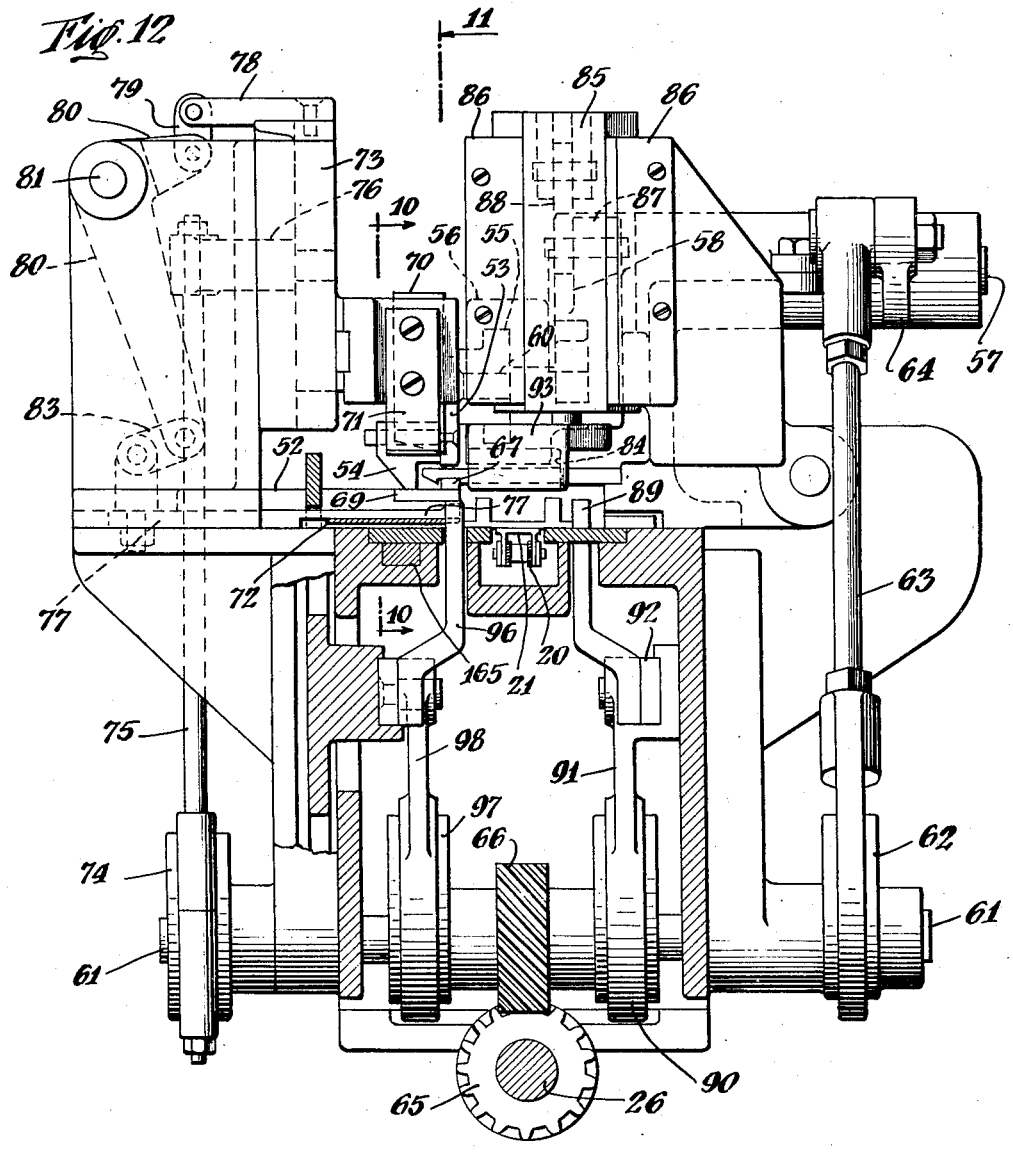
Fig. 12 is a vertical sectional view substantially on the plane of line 12—12 of Fig. 9.

Refer now to Figs. 2, 3 and 8 to 12 inclusive. Arranged alongside conveyer 20 is the match-comb feeding mechanism. 52 indicates a table or support for the match-comb, and above which is a reciprocatory comb feed device 53 having a number of loosely pivoted feed dogs 54. Device 53 is carried by slide 55, mounted in suitable guides 56, and receives its motion from rock-shaft 57 by means of yoke 58, carried by said rock-shaft, and sliding block 59 pivotally supported at 60 on slide 55. Rock-shaft 57 receives its motion from cross-shaft 61 by means of eccentric 62, connecting rod 63 and link 64. Shaft 61, in turn, derives its motion from main shaft 26 by means of spiral gears 65 and 66 having a one to one ratio. A double-layer match-comb strip M is placed on table 52 beneath dogs 54 and against stop 67. The comb is of relatively great length, as shown by reserve comb strip M', and has to be severed into appropriate comb-sections that are then associated with the covers. Dogs 54 are so spaced and the extent of reciprocating movement of 53 is such that on each stroke of 53 the comb strip is advanced parallel to conveyer 20 a distance equal to the length of comb-section to be severed. The number of dogs employed and the length of the comb strip is such that rear dog 54a is behind the rear edge of the comb strip, and therefore the first forward stroke of 53 will cause dog 54a to advance the comb strip one step, the rest of dogs 54 resting on top of said strip. On the return stroke, dogs 54 will slide idly over the comb strip, and said strip being now shorter, dog 54b will drop behind it and, on the next forward stroke of 53, dog 54b will feed the comb strip and so on until the strip is used up when reserve comb strip is brought forward against stop 67 and the previously described sequence of operations is repeated. Obviously, the reserve comb strip M' may be positioned by hand or by means of a feed belt 68 properly timed with the other parts of the machine. The comb strip in being fed forward passes over stationary knife-member 69 and the outer end of said strip is severed by vertically reciprocating knife 70. Knife-member 70 carries a pusher or ejector 71 that pushes the severed comb-section into transversely extending guide 72 which is at the same level as conveyer 20. Knife member 70 slides in guides 73 and receives its motion from cross-shaft 61 by means of eccentric 74, rod 75 and connection 76. 77 is a transversely moving feed member that moves the comb-section from guide 72 onto the cover carried by conveyer 20. Member 77 is actuated from the slide member of knife 70 by means of arm 78, link 79, bell-crank 80, on shaft 81, and link 83. Before the comb-section is fed to the cover carried by conveyer 20, the said cover has been subjected to certain operations. 84 indicates an abutment member which descends on the cover with a yielding pressure. It is carried by a slide 85 moving in guides 86, said slide being conveniently operated from rock-shaft 57 by means of arm 87 and link 88. A vertically reciprocating slide 89 cooperates with said abutment member or clamp and turns up a short end on the cover while the clamp is holding it, the result being a very definite bending of the cover. Slide 89 is actuated from eccentric 90, on shaft 61, by means of arm 91 and connection 92. Abutment member 84 also conveniently carries a side-registering device 93 which acts to guide the comb-section when the latter is fed by slide 77 onto the cover. The associated cover and comb-section now pass under a stationary bar or hold-down device 94 carried by bracket 95. 96 indicates a vertical slide to act against the cover to turn up the long end thereof, and is conveniently actuated from eccentric 97, on cross-shaft 61, by means of arm 98 and connection 99.

Refer now to Figs. 2, 3, 13 to 18 inclusive. Hold-down device 94 has a reduced extension 100, which is in effect a thin blade, under which the associated cover and comb-section pass. 101 is a horizontal slide moving in guides 102, and actuated from eccentric 103, on main shaft 26, by means of connections 104, 105, 106 and 107. 108 is a second horizontal slide moving in guides 109, and actuated from eccentric 110, on main shaft 26, by means of connections 111, 112, 113 and 114. Slide 101 acts to fold down the long end of the cover, and slide 108 acts to fold down the short end of the cover. 115 indicates a stitching mechanism to stitch the cover and comb-section together. It is unnecessary to describe the detailed construction of the stitching device, suffice it to say that it can be of a conventional type and that it is driven by means of sprockets 116 and 117 and chain 118. Sprocket 117 is mounted on shaft 118a which receives motion from shaft 119 by means of bevel gears 120; shaft 119 is in turn driven from main shaft 26 by means of spur gears 121 and 122. 123 is a clinching device to flatten the staple that the stitching device has driven through the cover and comb-section. The clinching device is carried by an arm 124 carried by rock-shaft 125 which receives its motion from shaft 118a by means of eccentric 126 and arms 127 and 128 pivotally connected. 129 is an ejecting device having two ejecting members 130 so as to simultaneously eject two completed match-books, and is in the form of a transverse horizontal slide moving in guides 131. This slide receives its motion from shaft 132 carrying a cam 133 with which engages a cam roller 134 mounted on arm 135 pivotally connected by arm 136 to rock-shaft 137, from which latter extends an arm 138 pivotally connected by means of link 139 to slide 129. Shaft 132 makes one revolution to each two revolutions of main shaft 26 and is driven from the latter by spur gears 121 and 140. Conveyor 20 is advanced intermittently one step to each revolution of the main shaft by any suitable means such as the following: sprocket 22 is secured to shaft 141 to which latter is also secured slotted member 142 of a Geneva stop motion device. Mounted on shaft 143 is a two-armed member 144 carrying rollers 145 to engage with the slots in member 142. Shaft 143 is driven from shaft 119 by means of bevel gears 146 and 147. Shaft 119 makes one revolution to each revolution of main shaft 26, and shaft 143 makes one revolution to each two revolutions of shaft 119, but inasmuch as shaft 143 carries two arms 144, it will be seen that shaft 141, and hence sprocket 22 and conveyer 20, makes two steps to each revolution of shaft 143, and one step to each revolution of main shaft 26. Shaft 141 drives shaft 145a by means of bevel gears 146a. Mounted on shaft 145a is a rotatable delivery member 148 which latter is thus moved a step to deliver a completed match-book every time conveyer 20 takes a step. Mounted alongside delivery member 148 is a reversing member 149 having a slot 150 for the reception of a match-book. This reversing member is rotated one-half of a revolution once to each two steps of delivery member 148, and is conveniently actuated from shaft 132 (which it will be remembered makes one revolution to each two revolutions of the main shaft) by means of cam 151, cam roller 152, arm 153, rock shaft 154, arm 155, rack 156 and gear 157, the latter carried by reversing member 149. As previously explained, ejectors 130 eject two completed match-books at a time from conveyer 20, and one of these passes over guide 158 directly to delivery member 148, while the other passes into slot 150 of reversing member 149. The delivery member thereupon takes a step delivering to trough 159 the match-book which it has received directly from guide 158. The reversing member makes one-half of a revolution thereby reversing the position of the match-book. Transfer device 160 now enters the open slot 150 and transfers a match-book from the reversing member to the delivery member and the latter takes another step while the transfer member is retracted. Transfer device 160 is actuated from the infeed end of the machine being driven from shaft 27 by means of cam 161, cam roller 162, arm 163, lever 164 loose on rock-shaft 37 and pivotally connected to rod 165 extending almost the entire length of the machine and secured at its other end to plate 165a. Plate 165a carries a bearing 165b receiving stem 165c of transfer device 160. When the reversing device is rotated, transfer member 160 and stem 165c rotate with it, this action being permitted by bearing 165b.

A brief summary of the operation of the device, reference now being made to Figs. 1ᵃ to 1ᶠ inclusive, is as follows: Two covers are fed simultaneously once to every two cycles of the machine, to conveyer 20, passing beneath guides as 25. Cover C now passes along with conveyer 20 until it reaches the station where clamp 84 descends upon it and slide 89 turns up the short end C′ of the cover. The match-comb strip M is fed along table 52 and knife 70 descends and cuts off a comb-section which latter passes into guide 72. When the cover arrives at the station opposite guide 72, side-registering device 94, carried by clamp 84, descends, and feed member 77 pushes the comb-section onto the cover and under hold-down device 94. The comb-section is front registered against short upturned end C′ of the cover and side registered by 93. When the cover and comb-section arrive at the next station, slide 96 rises and turns up the long end C2 of the cover. The cover and comb-section now pass under the thin extension 100 of hold-down device 94 and at this station slide 101 advances and folds down long end C2 of the cover over extension 100. At the next station, slide 108 advances and folds down short end C′ over the long end of the cover. The assemblage now passes to an idle station where nothing occurs. At the next station the assemblage has passed beyond extension 100, and stitcher 115 now descends and drives a staple C3 through the cover and comb-section in a known manner, after which the assemblage passes to a station where clincher 123 acts to clinch the staple. The assemblage now passes to the delivery station, and when two match-books have arrived side by side, ejector fingers 130 advance and push the two match-books out of the conveyer, the first one passing over guide 158 directly to delivery member 148, and the second one to reversing member 149. Delivery member delivers a match-book in an upright position to trough 159 with the thick end down. Reversing member 149 reverses the position of the match-book received by it, and transfer device 160 moves the reversed book to delivery member 148, which latter delivers said match-book in an upright position to trough 159 with the thick end up but in line with the first match-book.

The advantages of the methods and construction herein disclosed are simplicity and reliability of operation, and also an increase in speed, because, although cams could obviously be employed, eccentrics are used by preference to actuate the parts that operate once to each cycle of the machine, while those parts—as the cover feed—that preferably should have a slower movement are operated only twice to each cycle.

The means for feeding the cover blanks are not specifically claimed herein but form the subject matter of another application Ser. No. 48,280, filed November 5, 1935. So also the means for delivering the match-books are not claimed herein as such but form the subject matter of still another application Ser. No. 48,281, filed November 5, 1935.

I claim:

1. A match-book machine including: an intermittently moving conveyer; a series of mechanisms located along and acting after each intermittent movement of said conveyer to act sequentially upon covers and combs to associate the same; means located in advance of said mechanisms to simultaneously feed two covers in spaced relation to the conveyer after each two intermittent movements of the latter; and means to simultaneously deliver two match-books from said conveyer after each two intermittent movements of the latter.

2. The method of forming a match-book which consists in: turning up the short end of the cover; feeding the match-comb against said turned-up end; turning up and folding over the comb the long end of the cover; folding over the short end of the cover; and securing the cover and comb together.

3. In a match-book machine, the combination of a cover conveyer; and means to associate a comb-section with the cover on the conveyer including: mechanism to turn up the short end of the cover; a feeding device to feed a comb-section over the cover and against the upturned short end thereof; means to turn up and fold over the comb the long end of the cover; means to thereafter fold the short end of the cover and stitch it to the comb section; and transmission means to actuate the instrumentalities recited.

4. In a match-book machine, the combination of a cover conveyer; and means to associate a comb-section with the cover on the conveyer including: an abutment clamp to engage the cover; mechanism to turn up the short end of the cover against the abutment clamp; a feeding device to feed a comb-section over the cover and against the upturned short end thereof; means to thereafter fold the cover and stitch it to the comb-section; and transmission means to actuate the instrumentalities recited.

5. In a match-book machine, the combination of a cover conveyer; mechanism to turn up the short end of the cover; means to feed a match-comb strip along one side of said conveyer; a knife mechanism to sever a comb-section from the strip; a feeding device operating substantially at right angles to the movement of the conveyer to feed a comb-section over the cover and against the upturned short end thereof; means to turn up and fold over the comb-section the long end of the cover; means to thereafter fold the short end of the cover; means to stitch the short end of the cover to the comb-section; and transmission means to actuate the instrumentalities recited.

6. In a match-book machine, the combination of a cover conveyer; means to feed a comb-section to the cover on the conveyer; a hold-down device beneath and beyond which the conveyer passes; folding members to fold the cover about the hold-down device; and transmission means to actuate all the instrumentalities recited except the hold-down device.

7. In a match-book machine, the combination of a cover conveyer; mechanism to turn up the short end of the cover; a hold-down device beneath and beyond which the conveyer passes; means to feed a comb-section over the cover, beneath the hold-down device and against the upturned short end of the cover; folding members to fold the cover about the hold-down device; and transmission means to actuate all the instrumentalities recited except the hold-down device.

8. A match-book machine including: a cover conveyer; means to feed a cover to the conveyer; mechanism to turn up the short end of the cover; a hold-down device beneath and beyond which the conveyer passes; means to feed a comb-section over the cover, beneath the hold-down device and against the upturned short end of the cover; means to turn up the long end of the cover; folding members to fold down the long and the short ends of the cover about the hold-down device; stitching mechanism to stitch the cover and comb-section together; and means to deliver the match-book from the conveyer.

9. In a match-book machine, the combination of a cover conveyer; a side-registering mechanism, for a comb-section, extending transversely above and movable in and out of the cover conveyer; means to move said side-registering mechanism down and up into and out of the cover conveyer; and a feeding device operating substantially at right angles to the movement of the conveyer to feed a comb-section along said side-registering mechanism to a cover on the conveyer while the side-registering mechanism is in down position in the conveyer.

JOSEPH PEYSER.